July 8, 1952     E. P. ANDERSON     2,602,916
AUTOMATIC CONTROL SYSTEM
Filed March 22, 1951
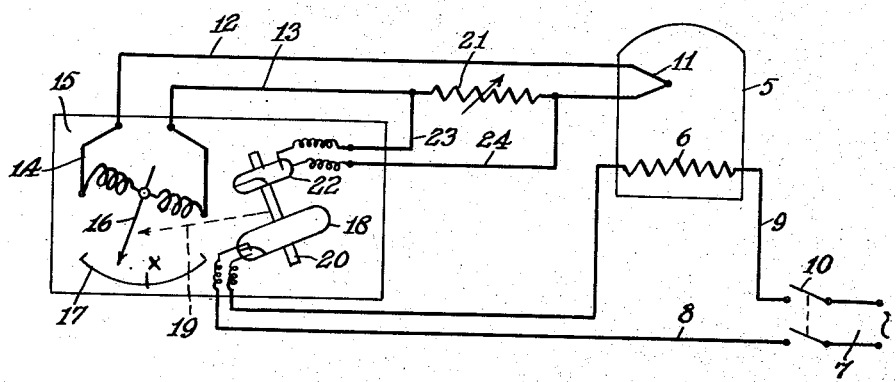
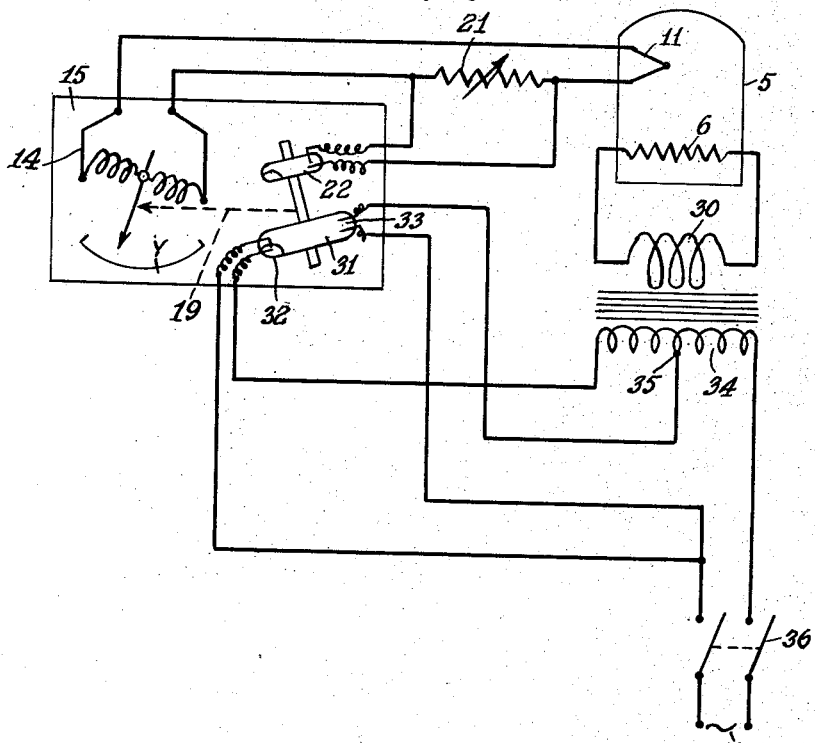
INVENTOR.
EDWARD P. ANDERSON
BY
ATTORNEY.

Patented July 8, 1952

2,602,916

UNITED STATES PATENT OFFICE 2,602,916

AUTOMATIC CONTROL SYSTEM

Edward P. Anderson, Rutherford, N. J., assignor to Charles Englehard, Inc., Newark, N. J., a corporation of New Jersey Application March 22, 1951, Serial No. 217,040

1 Claim. (Cl. 323—43.5)

This invention relates to control systems and more particularly to an electrical circuit for control instruments or mechanisms that operate to change the condition of a device which is to be regulated or otherwise controlled.

For the purposes of illustration and convenience the invention will be described with particular reference to a system adapted to control the temperature of a furnace; however, it should be understood that the invention is equally applicable to control systems generally.

Control instruments of the usual type for maintaining the temperature of a furnace at a predetermined value, operate in an "on-off" manner, i. e. when the temperature drops below a certain value the heat is turned on and when the temperature rises above that value the heat is turned off. In many installations systems of this type are subjected to rapid oscillations of the control instruments causing severe disturbances in their settings and greatly increased wear, thus requiring frequent recalibrations and replacement of parts. Such systems have been improved upon by the provision of an auxiliary heating system of lower power that operates after full power has been turned off or operates in anticipation of again turning on of full power whereby abrupt changes in heat intensity are avoided. Although improvements of this type make it possible to avoid extreme changes in heat intensities and reduce the frequency of operation of the high power source, they do not satisfactorily correct for conditions of rapid demands in control settings which occur, for example, when the space or objects being heated have a high rate of heat loss.

Accordingly it is an object of this invention to provide a simple yet effective control system that will avoid rapid settings in the control instruments of the system and will cause such instruments to dwell on a setting for the duration of a predetermined increment in a change of the condition being controlled.

The invention is illustrated in the accompanying drawing in which:

Fig. 1 is a diagrammatic view showing a control circuit of the present invention applied to an electric furnace whereby the temperature of the furnace is controlled by alternately turning the heater on and off, and Fig. 2 is a diagrammatic view of the invention applied as illustrated in Fig. 1 but used in connection with a two position control arrangement for supplying full power to the furnace to bring it up to operating temperature and then reducing the rate of heating to maintain a predetermined temperature.

Referring to Fig. 1 of the drawing a furnace 5 is shown provided with an electrical resistance heating coil 6. The coil 6 is energized by a power source designated at 7 to which the coil is connected by the conductors 8 and 9 including the manually operated switch 10. Extending through the wall of the furnace is a thermocouple 11 connected by the conductors 12 and 13 to the terminals of the galvanometer 14 in the automatic temperature control mechanism 15.

The details of the construction of the control mechanism 15 are not shown on the drawing. For the purposes of this invention as applied in the presently described embodiment, the mechanism 15 may be of any form having a deflecting element associated with a switch through a mechanical or electro-mechanical linkage whereby the switch is caused to be operated when the said deflecting element is moved to a predetermined position by a motivating force derived from a change in the condition of the apparatus being controlled. Preferably, the control mechanism 15 is of the well known milli-voltmeter type having a drive means for operating a switch or other control device functionally related to a delicate galvanometer pointer, as is described, for example in Letters Patent bearing Nos. 1,842,371, 1,949,222, 2,065,220 and 2,267,028. Since the specific construction for the control mechanism 15 is well known in the art, and per se, is not considered as novel or as constituting this invention, it is believed that a detailed consideration thereof is here unnecessary. Suffice to point out that the mechanism is constructed to operate in a manner that when the needle or pointer 16 of the galvanometer 14 reaches a predetermined position X on the scale 17 it will cause the switch 18 to be opened through the galvanometer and switch linkage designated on the drawing by broken line 19. The switch 18, which is shown herein as a mercury switch mounted to oscillate on the shaft or cradle 20 is connected into the circuit of the heating coil 6 of furnace 5. When the manually operated switch 10 is closed, the coil 6 is energized during the time that the furnace temperature is below that indicated by point X on scale 17, and no current flows through the coil when the furnace temperature falls below point X.

A control system with only the elements already described will for the reasons explained above be subjected to frequent on and off operations which may at times become so rapid as to cause severe jarring and misalignment of the delicate parts of the control instruments. According to the present invention these disadvantages are avoided by the provision of a variable resistor 21 in the thermocouple-galvanometer circuit and connecting a switch 22 across the resistor as with conductors 23 and 24 so that when switch 22 is closed the resistance 21 will be shunted out of the circuit and the full power of the thermocouple will be applied to the galvanometer 14. The shunt switch 22 is arranged to be operated simultaneously with the main switch 18 and, as is shown on the drawing, the shunt switch is open when the main switch is closed and vice versa.

With this new arrangement it will be seen that when the pointer 16 reaches point X, the switch 22 will be closed and the resistor 21 will be shunted out of the galvanometer circuit, whereby the effect on the galvanometer of the E. M. F. derived from the thermocouple 11 will be increased and the pointer 16 will be shifted by a predetermined increment to the right of point X. The magnitude of this increment is determined by the setting on the variable resistor 21. Under these conditions the temperature of the furnace 5 will have to be reduced by an amount equal to said predetermined increment before the main switch 20 can be flipped to its closed position for again energizing the heating coil 6. When this occurs the shunt switch 22 is simultaneously flipped to its open position, causing the resistor 21 to further reduce the reading by the pointer and thereby requiring a longer period for heating of the coil 6 before the temperature is again brought up to point X.

In Fig. 2 the invention is diagrammatically illustrated in an arrangement for controlling a temperature condition similarly as shown in Fig. 1, but as here applied the main switch in the circuit for the furnace coil is a double make switch providing a two position control system. Like parts in the Figures 1 and 2 are similarly numbered. The furnace, as before, is provided with a thermocouple-galvanometer circuit including the resistor 21 shunted by the switch 22. The power circuit for energizing the furnace coil includes a transformer having its secondary winding 30 connected across the heating coil. The main switch 31 has a pair of contacts 32 in one end and a pair of contacts 33 in its other end. The contacts 32 are in the circuit of the primary winding 34 of the transformer; the contacts 33 are connected to a tap 35 on the winding 34. Full power is had when the contacts 32 are closed, while reduced power results when the contacts 33 are closed. Shunt switch 22 is arranged with respect to main switch 31 so that during the time that full power is applied the shunt switch will be open, and when reduced power is being used the shunt switch will be closed.

In operation when the temperature of the furnace is below that indicated by the point Y on the galvanometer scale, closing of the manually operated switch 36 will cause the coil 6 to be energized with full power. When point Y is reached, the main switch 31 and shunt switch 22 will be flipped by means of linkage 19 so that the coil will now be energized with reduced power. Closing of the shunt switch causes the galvanometer pointer to shift by a predetermined increment above the point Y in the manner explained above in connection with the description of the embodiment in Fig. 1. By means of this arrangement it will be seen that reduced power is supplied to the furnace over an extended period of time before the full power is again applied for reheating. Also, when full power is reapplied, it will be turned on for a longer period of time than would be obtained in systems without the circuit of this invention.

It will be obvious to those skilled in the art that while the invention is described in connection with an electric furnace, the control system may be used to control the temperature of any space or any furnace, such as controlling the operation of a motor driven valve in a fluid fuel supply line or controlling the operation of a stoker motor for a solid fuel burner. The thermocouple may be replaced by any other thermoelectric sensitive means such as, for example, a resistance bridge. The invention is not limited to the control of temperatures only but may be employed to control the value of any condition for which automatic control systems are commonly used. The basic idea of including a shunted resistor in the circuit of the sensing means is not necessarily limited to those instruments having a galvanometer needle as the indicating element. Other types may be used as well, such as for instance those employing an indicating quantity derived from a potential on the control grid of an electronic tube.

Without further description it is thought that the features and advantages of the invention will be readily apparent to those skilled in the art and it will, of course, be understood that the invention is not limited to the particular details shown or described except as defined in the appended claim.

What I claim is:

In a control system of the type including a device having an actuating coil the condition of which is to be controlled, the combination of a power supply circuit for supplying electrical energy to said coil and a control circuit for sensing and controlling the condition of said device, said power supply circuit including a main switch and a transformer having its secondary winding connected across said coil, said main switch being of the mercury type and having a first and a second pair of contacts one at each end thereof, the first pair of contacts being connected in the circuit of the primary winding of said transformer, the second pair of contacts being connected to a tap on said primary winding, said control circuit including an E. M. F. producing sensitive means for sensing the condition to be controlled having in series therewith a galvanometer indicator and a variable resistor, a shunt switch of the mercury type connected across said resistor, said two switches being mounted for simultaneous operation, an operating linkage between said galvanometer and said switches operable when a predetermined value of said condition is impressed upon said galvanometer, said switches being so arranged that said shunt switch is open when the first pair of contacts are closed to transmit full power to said coil and said shunt switch is closed when the predetermined value is reached simultaneously when the second pair of contacts are closed to transmit reduced power to said coil and to reposition the pointer of said galvanometer a predetermined increment above said predetermined value.

EDWARD P. ANDERSON.

REFERENCES CITED

The following references are of record in the file of this patent:

UNITED STATES PATENTS

| Number | Name | Date |
| --- | --- | --- |
| 2,022,097 | Uehling | Nov. 26, 1935 |
| 2,085,855 | Hunt | July 6, 1937 |
| 2,376,488 | Jones | May 22, 1945 |